United States Patent [19]

Rosendal

[11] Patent Number: 4,679,664
[45] Date of Patent: Jul. 14, 1987

[54] BLANKING IMPACT ABSORBER

[76] Inventor: Carsten Rosendal, 1 Østergade, 2. sal, DK-7400 Herning, Denmark

[21] Appl. No.: 912,656

[22] Filed: Sep. 29, 1986

Related U.S. Application Data

[63] Continuation of Ser. No. 685,892, Dec. 24, 1984, abandoned.

[30] Foreign Application Priority Data

Dec. 27, 1983 [DK] Denmark ............... 5986-83

[51] Int. Cl.⁴ ............................................... B60T 7/12
[52] U.S. Cl. .................................... 188/134; 188/266; 188/271; 188/272; 188/378; 267/130; 267/137
[58] Field of Search ............... 188/134, 378, 381, 266, 188/272, 129, 271; 267/130, 134, 137, 75; 74/424.8 C; 446/241

[56] References Cited

U.S. PATENT DOCUMENTS

| | | | |
|---|---|---|---|
| 1,790,773 | 2/1931 | Smith | 188/129 |
| 1,985,716 | 12/1934 | Bueschel | 446/241 |
| 3,585,869 | 6/1971 | Lemor | 74/424.8 C X |
| 3,595,350 | 7/1971 | Wiebe | 105/197 DH X |
| 3,756,351 | 9/1973 | Sasaki | 188/378 |
| 3,809,186 | 5/1974 | Suozzo | 188/268 |
| 3,876,040 | 4/1975 | Yang | 188/378 |
| 4,054,186 | 10/1977 | Banks | 188/378 |
| 4,103,760 | 8/1978 | Yang | 188/134 |
| 4,105,098 | 8/1978 | Klimatis | 188/378 |
| 4,185,720 | 1/1980 | Wright, Jr. et al. | 188/134 |
| 4,187,933 | 2/1980 | Calabrese et al. | 188/134 |
| 4,194,598 | 3/1980 | Suozzo | 188/134 |
| 4,275,802 | 6/1981 | de Groot et al. | 188/134 |
| 4,289,218 | 9/1981 | Uranco | 188/134 |
| 4,339,975 | 7/1982 | Carrieri | 262/119 X |
| 4,375,770 | 3/1983 | Druet | 74/424.8 C X |

FOREIGN PATENT DOCUMENTS

| | | | |
|---|---|---|---|
| 372701 | 3/1923 | Fed. Rep. of Germany | 446/241 |
| 2512822 | 9/1976 | Fed. Rep. of Germany | |
| 2653714 | 3/1978 | Fed. Rep. of Germany | |
| 2748145 | 5/1979 | Fed. Rep. of Germany | |
| 570535 | 1/1924 | France | 188/129 |
| 1043384 | 9/1983 | U.S.S.R. | 188/381 |

Primary Examiner—George E. A. Halvosa
Attorney, Agent, or Firm—Oblon, Fisher, Spivak, McClelland & Maier

[57] ABSTRACT

A mechanical, vibration-preventing means to be used on mechanical and hydraulic presses, bar cutters, shearing machines and the like preferably cyclicly working machine tools with a pulse-like pressing process is adapted to absorb the stroke at punching and cutting in plates, bars, and the like articles of metal, plastics or another material by the resilient energy deriving from the deflection of the machine frame instead of being converted into vibrations and noise immediately after break through of the material being converted directly into rotational energy in a flywheel through a roller screw connection. This roller screw connection transforms the translatory movement of the machine tools into rotation. A free engine clutch ensures that the flywheel—accelerated as a consequence of the above procedure—does not start to pull at the structure of the machine during the reverse movement of the machine tool by a force almost as great as the process force immediately before the energy is received by the flywheel, because only very few machine tools of the above type can bear such tensile forces. The energy supplied to the flywheel is subsequently dissipated before the next cycle of the machine.

5 Claims, 8 Drawing Figures

BLANKING IMPACT ABSORBER

This application is a continuation of application Ser. No. 685,892, filed Dec. 24, 1984, now abandoned.

BACKGROUND OF THE INVENTION

1. Field of the Invention

The invention relates to a shock absorber, i.e. a so-called inertial shock absorber providing impact absorption during blanking.

2. Related Art

Shock absorbers of the hydraulic type where the absorbing effect is obtained by oil being pressed through a nozzle or a throttle valve are known in connection with mechanical and hydraulic presses. These shock absorbers are mounted parallel to the tool between the movable member of the press, i.e. the slide, and the stationary member of the press, i.e. the press table. When the cutting tool in the press closes and the punches of the tool initiate a punching out of articles from the material in a blanking operation, the press frame, which may be considered a very rigid spring, is stretched whereby energy is stored therein. When the article partially punched out no longer can bear the press force, the material breaks and the process force drops to zero. As a result, the heavily stretched press frame is relieved very quickly with a pulse-like impact. This dynamic effect on the press causes violent vibrations, and the hydraulic shock absorbers mounted parallel to the tool try to prevent this effect by producing a counteraction immediately upon breaking of the material in such a manner that the total load on the press can pass off uniformly as to time.

A hydraulic shock absorber produces, however, a counteraction proportional to the relative speed of the tool members and since the speed of these members is relatively slow in the moment of break through, no significant reaction force is produced by the hydraulic shock absorber in the moment of break through. An efficient counteraction is not produced by the hydraulic shock absorbers until the stretched press frame has accelerated the press and tool members to a sufficiently high speed over a certain length. This delayed reaction causes unavoidable force steps in the press frame and limits consequently the noise and vibration preventing effect of the hydraulic shock absorber.

Hydraulic shock absorbers are often situated on the press table or corresponding supports, whereafter the height of the absorbing pistons is adjusted in such a manner that the hydraulic shock absorbers are not activated until the slide abuts them immediately before the material breaks. Now the speed of the slide relative to the press table is relatively low so that the impact-like coupling of the hydraulic shock absorbers causes no problems of importance.

Hydraulic shock absorbers cannot be secured at both ends to the slide and the press table, respectively because the reaction force of the shock absorbers in the first part of the press stroke before the tool is activated is much too great and consequently involves an overwhelming loss of energy. For the same reason hydraulic absorbers are only employable in connection with tools involving a cutting on a level adjacent the bottom of the stroke, i.e. the bottom dead centre.

This loss of energy at a permanent coupling of hydraulic shock absorbers is due to the fact that the speed reached by the press members immediately after the breaking of the material is of the same magnitude (only 2–3 times greater) as the maximum speed reached in an idle stroke without material in the tool. In other words, in order to provide a sufficient counteraction at the breaking of the material the shock absorber has an absorbing coefficient adapted to the size of the nozzle which implies that the reaction effect on the movement of the slide is much too great in the steps of the stroke where no absorbing effect is necessary. Furthermore, the effect of hydraulic shock absorbers when used on presses is limited because of the following conditions:

(a) A press is of an extremely rigid and dynamic structure, where the deflection typicaly only amounts to 1–2 mm at the max. press force. This deflection is too short for utilizing a shock absorber efficiently.

(b) A hydraulic shock absorber produces a reaction force proportional to the relative speed of the members, which means that when the break through occurs and the press force drops to zero, only a modest absorbing effect applies as the relative speed of the tool members is low. The acceleration of the tool members relative to an idle stroke is, however, typically 100 to 150 times greater as to the release of the spring energy in the stretched press frame.

The absorbers possess no substantial counteraction until the above acceleration force has made the press and tool members reach a sufficiently high speed over a certain length (0.25–0.50 mm). At this moment a substantial portion of the stored energy has been converted into kinetic energy, and nothing but a partial lowering of the vibration level and consequently of the noise level occurs.

(c) Hydraulic shock absorbers cannot be provided with very small nozzles as an attempt at reducing he reaction time and in order to obtain an increased absorbing coefficient because the continued movement of the slide towards the bottom dead centre must be ensured without a too violent counteraction and consequently without loss of energy and press force.

Various initiatives have been made of increasing the pressure-producing speed in the hydraulic shock absorber and consequently of reducing the reaction time, which for instance has been described in:

DE-OS No. 25 12 822, where the absorbing coefficient is made proportional to the deflection of the press frame by means of a mechanical rod system, DE-AS No. 26 53 714, where the oil pressure in the absorbing cylinder is controlled by an ultrafast electrohydraulic servo valve, DE-AS No. 27 48 145, where the absorbing coefficient is adjusted by means of a cone valve controlled by the oil pressure in the absorber.

All the above absorbers are characterised by a high complexity and a certain degree of specializing and limitation as to use.

The U.S. patent specifications Nos. 4,054,186 "Snubber Apparatus" and 4,350,232 "Mechanical Shock Arrestor" disclose shock absorbers converting a linear, telescopic movement into a rotation of an inertial mass connected to a frictional braking device. The U.S. patent specification No. 4,289,218 "Mechanical Motion-Snubbing Device" discloses a corresponding shock absorber converting a linear, telescopic movement into a rotation of an inertial mass and where the energy is absorbed by a collision between said inertial mass and one or more other inertial masses. These absorbers react against all accelerating movements in both axial directions and dissipate the energy continuously. These absorbers are constructed to protect atomic plant installations and pipelines against seismic vibrations, explosions and the like catastrophes, and are not suited for shock absorbing in a machine tool.

SUMMARY OF THE INVENTION

The inertial shock absorber according to the invention is characterised whereby an acceleration-dependent reaction force is obtained in connection with a moving of the two interconnected halves of the inertial shock absorber, whereby the shock absorber can be used as a blocking mass.

As the relative acceleration of the press and tool members in the moment of break through is several magnitudes greater than the acceleration at any other time during the press stroke, the shock absorber can be permanently connected to the upper and lower part of the tool or the machine tool unlike the known hydraulic shock absorbers and without loading the machine tool significantly. Furthermore, the shock absorber according to the invention can follow the movements up and down or forward and backwards, and it reacts only considerably at a sudden increase of the acceleration of the parts.

By utilizing the acceleration-dependent counteracting effect of the inertial shock absorber, it is possible to obtain a substantially faster reacting absorption in the form of the said counteracting effect, which in the moment of break through of the material increases as quickly as the process force drops, whereby the force step is substantially reduced and a violent excitation of the natural frequencies of the machine frame is avoided.

According to the general use of blocking masses on vibrating systems the mass is situated directly on a suitable location on the vibrating system, which in connection with presses and corresponding machine tools often would require very great bodies with a mass several times greater than the mass of the machine tool, which is unrealistic.

The linear speed of the tool machine is instead transformed or geared up by means of a known movement-transforming screw member, such as for instance a roller screw, into an angular speed in such a manner that peripheral speeds are obtained which are much higher than the linear speed, typically 25 to 50 times higher. As a result, a relatively small mass situated on the periphery has the effect of a substantially greater mass situated directly against the linear movement.

The above will be illustrated below by means of the following equations where:
a = linear acceleration
$\dot{\omega}$ = angular acceleration
F = force
M = moment
s = the pitch of the screw
$m_e$ = equivalent mass
$m_s$ = the mass of the flywheel
$r_i$ = the inertial radius of the swinging mass
I = the inertial moment The relation between linear acceleration and angular acceleration as well as between force and moment are given by:

$$a = \dot{\omega} \cdot s / (2 \cdot \pi) \quad \text{equation 1}$$

$$F = M \cdot 2 \cdot \pi / s \quad \text{equation 2}$$

According to Newton's second law (F=m·a) the apparent (equivalent) mass $m_e$ represented by the inertial shock absorber according to the invention is:

$$m_e = F/a = (M/\dot{\omega}) \cdot (2 \cdot \pi / s)^2 \quad \text{equation 3}$$

the equations 1 and 2 being inserted.

As $M/\dot{\omega} = I$ is obtained, the inertial radius of the swinging mass $m_s$ being $r_i$:

$$M/\dot{\omega} = I = m_s \cdot r_i^2 \quad \text{equation 4}$$

which by insertion into equation 3 results in:

$$m_e = m_s (2\pi \cdot r_i / s)^2 \quad \text{equation 5}$$

and consequently in the dimensionless mass transformation ratio $m_e/m_s$ given by:

$$m_e/m_s = (2 \cdot \pi \cdot r_i / s)^2 \quad \text{equation 6}$$

capable of assuming all positive values, but which usually is in the range 300-2000 at a suitable choice of parameters in connection with machine tools, which corresponds to a ratio $r_i/s$ of the magnitude 2-7.

The mass transformation ratio is determined from the size of the equivalent mass to be added to the machine structure, as well as from the actual physical mass of the flywheel. This actual physical mass of the flywheel is in turn determined from the fact that the size of the flywheel must correspond to the remaining mechanical components of the construction, but simultaneously said size must not be greater than necessary because of the often narrow conditions on machine tools.

The flywheel of a 1500 kN inertial shock absorber is for constructional reasons already of a size typically only involving a mass transformation of 400-500 times, whereas the flywheel of a 160 kN inertial shock absorber is so modest that it is often necessary to involve a mass transformation of 1500-1600 times, which according to equation 6 is obtained by reducing the pitch s of the spindle.

In order to make the inertial shock absorber act as a "clean", i.e. a non-resilient, mass it is furthermore necessary that the total resilience of the inertial absorber, determined by the size and strength of the construction members, is substantially less (at least 5 times) than the total resilience of the structure, i.e. the machine tool frame, which is to be subjected to the inertial absorber as a blocking mass. As a result, the momentaneous force relief, i.e. the unavoidable, dropping force step, before the blocking mass becomes active, is reduced to maximum 1/6 of the force step appearing without the use of an inertial shock absorber.

In order to prevent the flywheel, rotating fast after the transfer of energy, from starting through the screw member to pull at the machine structure, the shock absorber may according to an embodiment be provided with a free engine clutch. When the screw is subjected to tensile and not compressive forces, this clutch allows the screw to rotate together with the flywheel, the static frictional moment in the clutch being lower than the moment on the screw deriving from the rotation of the flywheel, whereby the clutch surfaces slide relative to one another. Immediately after the decoupling of the free engine clutch, the energy just transferred from the machine tool frame to the flywheel is dissipated, the energy stored in the coupling at the sliding being taken from the flywheel, whereby said flywheel is braked in such a manner that the shock absorber is ready for the next cycle. Furthermore, the oil film between the flywheel and the stationary housing assists in viscously braking the flywheel possessing a high rotational speed relative to the idle movement after having received the energy.

When using an acceleration-dependent shock absorber according to the invention the following advantages are obtained compared to hydraulic shock absorbers:

constant and permanent coupling of the shock absorber and consequently no critical adjustment of the height between each change of tools, a total shock absorption during the entire press stroke, which means that the cutting operation may be made in any position, and optionally several succeeding cutting operations or for instance a punching out followed by a deep drawing may take place, which is impossible by hydraulic shock absorbers on account of their restricted length of stroke as well as an immense loss of energy, no reduction of the capacity of the press like by hydraulic shock absorbers where the speed-dependent reaction force absorbs a considerable part of the pressing and working capacity especially of mechanical presses, only the energy stored in the press frame is dissipated, said energy being lost in any cases. In connection with hydraulic absorbers, energy is also absorbed while the absorbers are moving from the moment immediately before the material breaks to the lower bottom dead centre, which involves a risk of superheating.

BRIEF DESCRIPTION OF THE DRAWINGS

The invention will be described below with reference to the accompanying drawings, in which.

DETAILED DESCRIPTION OF THE PREFERRED EMBODIMENTS

Figure 1:
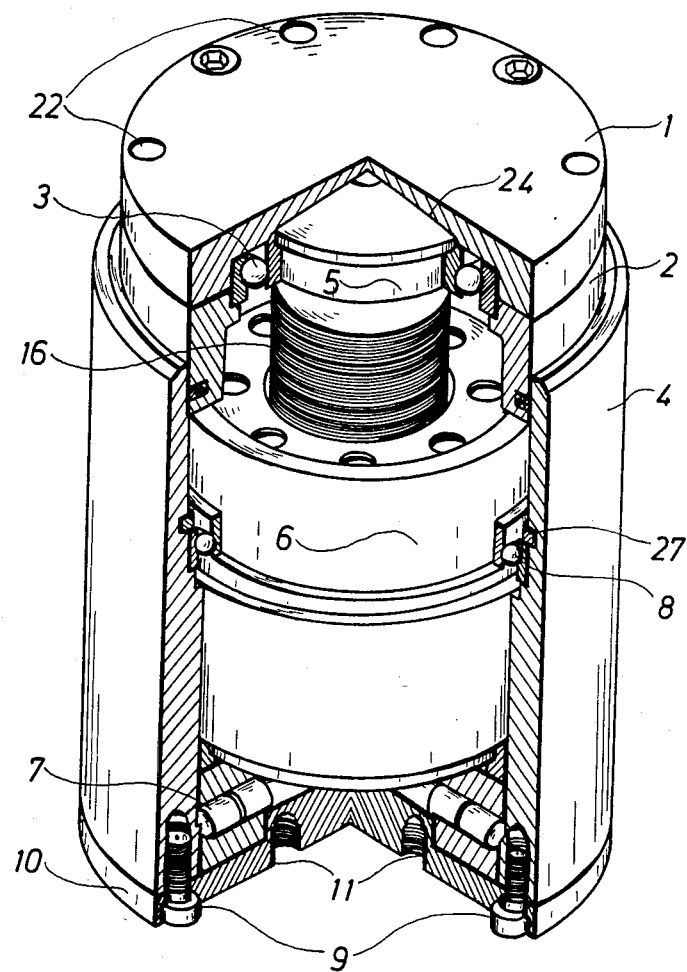
FIG. 1 is an isometric view of an embodiment of the shock absorber according to the invention.

The inertial shock absorber of FIG. 1 comprises a top cover 1 forming together with a bearing ring 2 a bearing housing for a ball bearing 3. This bearing housing is axially displaceable in an outer housing 4, whereby a roller spindle 5 translatorically connected to the bearing housing is displaced into a roller nut 6. As a result, this roller nut rotates as it is supported by an axial bearing 7, which together with a ball bearing 8 maintain the roller nut 6 against translational movement relative to the outer housing 4. By means of screws 9 the outer housing 4 is secured to a bottom plate 10 provided with threaded holes 11 for the mounting of the shock absorber into a press table 12, cf. FIG. 2.

The roller screw-roller nut members 5 and 6 are known and form a so-called "antifriction screw" or a low friction screw. This screw is reversible in such a manner that an axial force applied onto the spindle 5 fixed against rotation makes the nut 6 rotate, said nut being supported by the axial bearing 7.

Figure 3:
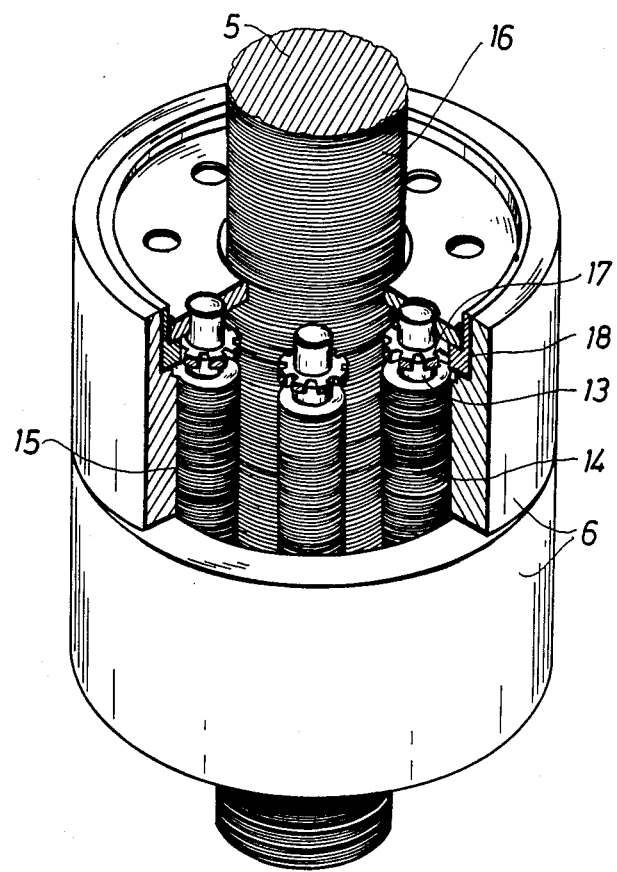
FIG. 3 is an isometric view of the movement-transforming member.

As illustrated in FIG. 3, the reversibility of the roller screw is obtained by a predetermined number of rollers 13 with threads 14 performing a planetary rotation between an internal thread 15 on the nut 6 and an external thread 16 on the roller spindle during the movement-transformation. In this manner a movement of the screw with a very low, rolling friction is obtained instead of the much greater sliding friction at usual screw-nut connections.

The pitch angle is the same as far as the threads 14 and 16 are concerned, but it is smaller as far as the thread 15 is concerned because the pitch angle of said thread 15 positioned on a greater diameter must be smaller as the threads 15 and 16 must have the same pitch. These and other geometric conditions imply that the rollers 13 remain axially positioned relative to the nut 6. However, in order to ensure this geometrically determined positioning, the rollers are provided with a toothing 17 at both ends, whereby a toothed rim 18 ensures the correct planetary rotation of the rollers.

The shock absorber is secured to the movable member, i.e. the slide 20, of a press 19 by means of screws 21 through idle holes 22 in the top cover 1 for the bearing ring 2.

Furthermore, the shock absorber is secured to the stationary part, i.e. the press table 12, of the press by means of screws 23 extending upwards into the bottom plate 10 provided with threaded holes 11 for this purpose.

Figure 4:
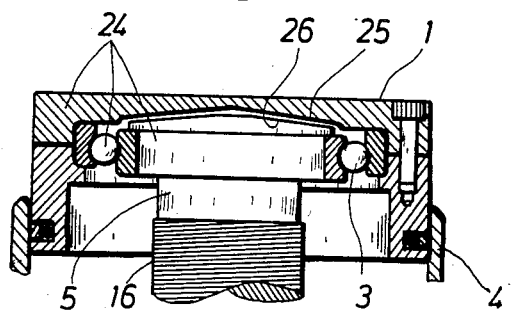
FIG. 4 is a planar sectional view of the friction clutch brake.

The translational movement of the slide 20 is coupled to the spindle 5 through a free engine clutch 24, cf. FIG. 4, which comprises an inner conical surface 25 in the top cover 1, an outer conical surface 26 at the end of the spindle 5, and a ball bearing 3. In FIG. 4, the coupling is illustrated with the spindle 5 decoupled and with an exaggerated gap between the coupling surfaces 25 and 26.

The two conical surfaces 25 and 26 have the same top angle and form the coupling face, and they are tightened together by means of a predetermined distortion force between the top cover 1 and the bearing ring 2.

When the force is directed inwards, the conical surface 25 of the top cover is in contact with the conical surface 26 of the spindle 5, and this force produces a torque between the spindle 5 and the nut 6. As the friction moment between the conical coupling surfaces 25 and 26 is greater than the torque determined by the effect of the force, the spindle 5 is fixedly connected to the top cover 1 in turn screwed fixedly onto the slide 20 and consequently secured against rotation. In this manner the effect aimed at is obtained, viz. that the nut 6 produces an immediate inertial reaction against the load of the press frame 19 stretched 15 out. That is, the axial movement of the spindle rotationally accelerates the flywheel, which absorbs a part of the energy released by the press when the cutting tool breaks through a workpiece. Subsequently, during an accelerating rotation on account of the torque deriving from the above load, the nut 6 allows on account of the thread 16 a slow translatory movement of the spindle 5 and consequently of the top cover 1 and the slide 20 into the outer housing 4 so as thereby to relieve the press frame 19 slowly.

As a result, the major portion of the resilient energy stored in the press frame 19 is transferred into rotation energy in the nut 6. As a result the nut 6 quickly achieves a rotation exceeding the rotation speed which in response to the pitch of the thread corresponds to the translatory speed of the spindle 5, the speed of the slide 20 and consequently also of the spindle 5 decreasing towards the bottom dead centre of the press stroke so as finally to reverse.

A completely rigid connection between the slide 20 and the spindle 5 implies that the nut 6 would start to pull at the spindle 5 at the bottom of a pressing stoke, and consequently at the entire press 19 by a force almost as great as the force received by the inertial shock absorber in the punching moment. Most presses are not constructed to bear such a tensile force, and the shock absorber is therefore provided with the free engine clutch 24. This free engine clutch provides that when the nut 6 starts to pull at the spindle 5 downwards/inwards as a consequence of its fast rotation after a completed energy reception, this pulling load is received by the ball bearing 3, whereby the tightening force between the friction surfaces 25 and 26 drops. Subsequently, an equilibrium between the tightening force, the coupling force, and the pulling force balances on a level where the dynamic friction moment of the coupling surfaces balances with the spindle moment deriving from the reaction between the spindle 5 now rotating and the nut 6 so that the friction surfaces 25 and 26 slide against one another. In this manner the dynamic pulling forces on the slide and consequently the entire press 19 are restricted considerably since the clutch permits sliding at 25 and 26. At the same time the surfaces 25 and 26 function as a mechanical brake on the flywheel 6 until the conditions are such again that the coupling couples the spindle 5 to the top cover 1. The tightening force of the coupling must assume such a value that no decoupling occurs during idling strokes, unnecessary losses during idling thereby being avoided. While subjected to the above pulling forces, the roller nut 6 is prevented from translatorically moving the ball bearing 8, the reaction force of which is received by the bottom plate 10 through a locking ring 27 and the outer housing 4 and further by the press table 12.

Figure 5:
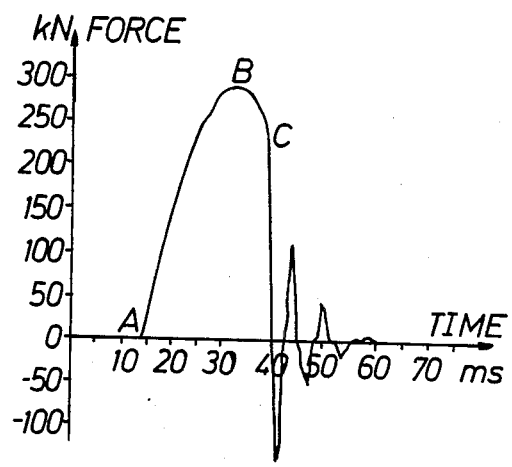
FIG. 5 illustrates the process force as function of the time without a shock absorber.

FIG. 5 illustrates the pressing force as function of the time for a typical punching out of a general sheet metal. At A the punches of the tool hit the material and the pressing force is built up relatively slowly while the machine frame is being stretched out. At B the yield point of the material has been reached and an actual cutting in the material begins. At C the article partially punched out or cut off cannot resist the pressure any longer and the material breaks and violent vibrations of the frame and the tool arise in connection with the sudden relief.

Figure 6:
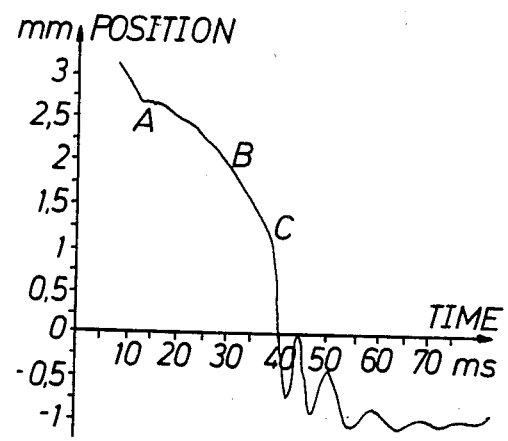
FIG. 6 illustrates the relative position of the tool members as function of the time without a shock absorber.

FIG. 6 illustrates the position of the slide relative to the press table and consequently also the relative position of the tool members as function of the time. At A the speed of the slide decreases when the punches hit the plate material, the machine frame being stretched out. At B the relative speed of the tool members is increased again when the yield point of the material has been reached, and at C a violently vibrating movement of the tool members takes place.

Figure 2:
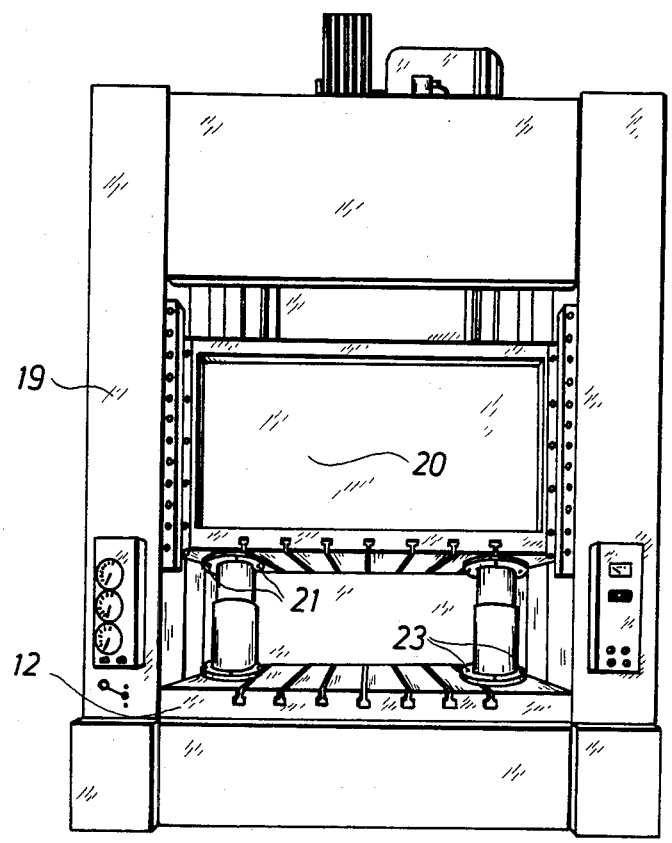
FIG. 2 illustrates two inertial shock absorbers with flanges built in a press.
Figure 7:
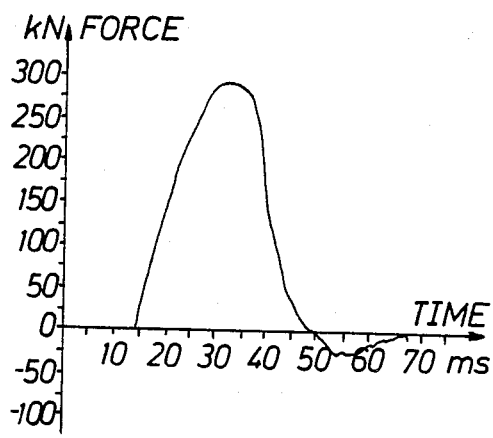
FIG. 7 illustrates the process force as function of the time with mechanical shock absorbers.
Figure 8:
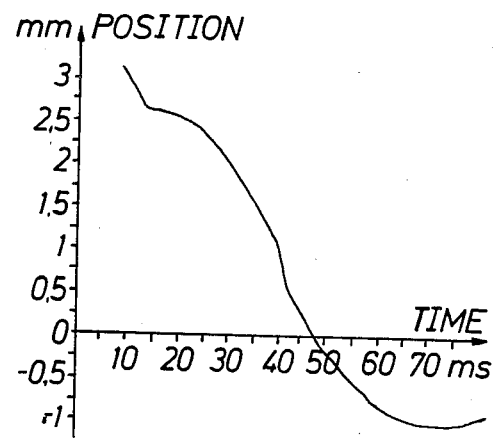
FIG. 8 illustrates the relative position of the tool members as function of the time with mechanical shock absorbers.

FIGS. 7 and 8 illustrate the same processes with respect to time of the pressing force and the tool position, but whereby shock absorbers have been mounted on the press, cf. FIG. 2.

An example by way of numbers illustrate the conditions of a 320 kN punch press, where two 160 kN inertial absorbers with roller screws are to be used:

When the flywheel of each absorber is considered a cylinder shell with
the height h=70 mm
the outer radius R=45 mm
the inner radius r=30 mm
an inertial radius is achieved given by:

$$r_i^2 = \tfrac{1}{2} \cdot (R^2 + r^2) = \tfrac{1}{2} \cdot (45^2 + ^2)$$

$r_i = 38.25$ mm and in case of a density of 7800 kg/m$^3$ a mass of the flywheel $m_s$ of $$m_s = \rho \cdot \pi \cdot (R^2 - r^2) \cdot h$$
$$= 7800 \cdot 10^{-9} \cdot \pi \cdot (45^2 - 30^2) \cdot 70 \text{ kg}$$

$m_s = 1.93$ kg is achieved.

By a spindle pitch of 6 mm the mass exchange ratio according to equation 6 produces a mass ratio of $$m_e/m_s = (2 \cdot \pi \cdot 38.25/6)^2 = 1604$$

and consequently an equivalent mass of each shock absorber of $$m_e = 1604 \cdot m_s$$

$m_e = 3096$ kg is achieved.

Accordingly together the two inertial shock absorbers function as a 2.3096 kg=6192 kg blocking mass positioned at the tool.

According to the illustrated embodiment, the inertial shock absorber is secured to the slide and the press table, respectively. Nothing, however, prevents the shock absorber from being built into the punching tool, either by a securing on the planes of a pillar die set if used or by integration into the tool construction.

In the illustrated embodiment, the inertial shock absorber is only used in connection with presses. Nothing, however, prevents the inertial shock absorbers from being used in connection with bar cutters, shearing machines or other tools, the function of which involves pulse-like load processes.

For symmetric reasons shock absorbers are usually used in pairs or four by four. They may, however, in principle be used in an arbitrary number.

I claim:

1. A blanking impact absorber for a press like machine tool having a stationary member and a movable member between which a workpiece may be positioned, said impact absorber comprising:

a housing fixed to one of said stationary and movable members of said machine tool;

a flywheel mounted in said housing by means for permitting only rotation of said flywheel about a rotational axis;

a spindle extending coaxially with said rotational axis and mounted by means for permitting rotation about said axis and movement along said axis;

means for rotating said flywheel in response to movement of said spindle along said rotational axis and for movement of said spindle along said rotational axis in response to rotation of said flywheel, whereby energy of movement is transformed from said machine tool to said flywheel and back again;

a cover fixed to the other of said stationary and movable members of said machine tool and being connectable with said spindle for transferring pressing and tensile forces between said cover and said spindle;

clutch means for preventing rotation of said spindle about said rotational axis in response to a pressing force on said cover along said axis and for allowing rotation of the spindle about said rotational axis in response to a tensile force provided from said rotating flywheel, said tensile force provided from said rotating flywheel being greater than tensile forces arising during idling of said press-like machine tool; and means for braking rotation of said spindle about said axis, whereby energy of rotation of said flywheel is dissipated.

2. The impact absorber of claim 1 wherein said means for rotating said flywheel in response to movement of said spindle comprise low friction meshing screw thread means.

3. The impact absorber of claim 2 wherein said clutch means comprise:
a first conical surface of said cover having a conical axis coaxial with said rotational axis;
a second conical surface of said spindle shaped to mate with said first conical surface, whereby said pressing force causes said first and second conical surfaces to frictionally mate and lock with one another.

4. The impact absorber of claim 3 wherein said brake means comprise means for resiliently supporting said spindle in the direction of said rotational axis such that said first and second surfaces remain in sliding contact in the absence of said pressing force.

5. The impact absorber of claim 4 wherein said means for resiliently supporting comprise roller bearing means.

* * * * *